United States Patent
Weddeling et al.

(10) Patent No.: US 7,673,245 B2
(45) Date of Patent: Mar. 2, 2010

(54) CONVERTING USER INTERFACE PANELS

(75) Inventors: Peter Weddeling, Sinsheim (DE); Rene Dehn, Sinsheim (DE); Martin Scholz, Nussloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1258 days.

(21) Appl. No.: 10/686,008

(22) Filed: Oct. 15, 2003

(65) Prior Publication Data

US 2005/0086201 A1    Apr. 21, 2005

(51) Int. Cl.
*G06F 3/00* (2006.01)
*G06F 3/048* (2006.01)

(52) U.S. Cl. .................. 715/746; 715/744; 715/781; 715/788; 715/803

(58) Field of Classification Search ......... 715/505–508, 715/803, 762, 744, 746, 781, 788; 707/104.1
See application file for complete search history.

(56) References Cited

U.S. PATENT DOCUMENTS

| | | | | | |
|---|---|---|---|---|---|
| 4,823,283 | A | * | 4/1989 | Diehm et al. ............... | 715/825 |
| 4,829,294 | A | * | 5/1989 | Iwami et al. ................ | 715/803 |
| 4,962,475 | A | * | 10/1990 | Hernandez et al. .......... | 715/515 |
| 5,367,619 | A | * | 11/1994 | Dipaolo et al. .............. | 715/506 |
| 5,640,577 | A | * | 6/1997 | Scharmer .................... | 715/507 |
| 5,802,514 | A | * | 9/1998 | Huber .......................... | 707/4 |
| 5,963,952 | A | * | 10/1999 | Smith .......................... | 707/102 |
| 5,968,119 | A | * | 10/1999 | Stedman et al. ............. | 709/219 |
| 5,999,937 | A | * | 12/1999 | Ellard ......................... | 707/101 |
| 6,006,240 | A | * | 12/1999 | Handley ..................... | 715/510 |
| 6,147,693 | A | * | 11/2000 | Yunker ....................... | 345/473 |
| 6,192,380 | B1 | * | 2/2001 | Light et al. ................. | 715/505 |
| 6,208,339 | B1 | * | 3/2001 | Atlas et al. .................. | 715/780 |
| 6,243,721 | B1 | * | 6/2001 | Duane et al. ................ | 715/505 |
| 6,342,907 | B1 | * | 1/2002 | Petty et al. .................. | 715/762 |
| 6,529,909 | B1 | * | 3/2003 | Bowman-Amuah .......... | 707/10 |
| 6,910,179 | B1 | * | 6/2005 | Pennell et al. .............. | 715/507 |
| 6,950,981 | B2 | * | 9/2005 | Duffy et al. ................. | 715/505 |
| 2002/0091709 | A1 | * | 7/2002 | Jung ......................... | 707/104.1 |
| 2004/0236616 | A1 | * | 11/2004 | Daughtrey ..................... | 705/5 |
| 2005/0005234 | A1 | * | 1/2005 | Chen .......................... | 715/508 |

OTHER PUBLICATIONS

DevDaily.com, Visual Café and the five minute TabPanel; (http://www.devdaily.com/java/edu/vc/vc010003/); 1998, p. 2.*
SAP AG, "Web Dynpro: Professional Web-Based User Interfaces Version 1.2", 2002, 26 pages.

* cited by examiner

*Primary Examiner*—Ba Huynh
*Assistant Examiner*—Nicholas Augustine
(74) *Attorney, Agent, or Firm*—Fish & Richardson P.C.

(57) ABSTRACT

Converting a computer user interface panel between different panel types. An automated process is activated that reads field attributes of a first panel in a computer system. A configuration table associated with the first panel is tied to logic that specifies how the panel of the first type interacts with a back-end of the computer system. Entries are created in a second configuration table that can be used to display a second panel in the computer system. The second panel comprises at least some of the plurality of fields and belongs to a second type of panels in which a panel of the second type is formed of configuration table entries and is independent of the backend. The automated process converts the field attributes to be compatible with the second type of panels and stores them in the second configuration table for use in displaying the second panel.

20 Claims, 4 Drawing Sheets

CONVERTING USER INTERFACE PANELS

TECHNICAL FIELD

This description relates to converting computer user interface panels between panel types.

BACKGROUND

Every computer has an interface between its executable routines and a user of the computer. User interfaces may include fields for the computer to output information to the user, and fields by which the user can input information to the computer. Fields may be associated with attributes that define properties of the fields. Changing a field attribute may change how the field is displayed on a screen of the computer.

An example of an existing user interface is the SAP graphical user interface, or "SAPGUI", provided with SAP systems and servers sold under the name R/3. The SAPGUI uses SAP's "dynamic program" or "dynpro" technology for generating displays in the user interface. The SAPGUI has associated with it flow logic that determines its interaction with the backend. The SAPGUI has a relatively strong relation to a backend of the system.

Other user interfaces, in contrast, may be less strongly tied to the backend. Some web-based server systems are capable of using commercially available web browsers as the user interface. For example, SAP has developed a Web Application Server that uses so called Web Dynpro user interfaces in which the application logic is separated from the user interface.

SUMMARY

The systems and techniques described here relate to converting a computer user interface panel between different panel types. A method comprises activating an automated process that reads field attributes in a first configuration table that can be used to display a first panel in a computer system. The first panel comprises a plurality of fields and belongs to a first type of panels in which a configuration table associated with a panel of the first type is tied to logic that specifies how the panel of the first type interacts with a backend of the computer system. Entries are created in a second configuration table that can be used to display a second panel in the computer system. The second panel comprises at least some of the plurality of fields and belongs to a second type of panels in which a panel of the second type is formed of configuration table entries and is independent of the backend. The automated process converts the field attributes to be compatible with the second type of panels and stores them in the second configuration table for use in displaying the second panel.

In selected embodiments, only those attributes of the first panel are read that are relevant for converting the first panel to the second panel.

In certain embodiments, the computer system provides that the user can edit the second panel. The user may modify attributes of the second panel. The computer system may provide a drag-and-drop environment for editing the second panel.

A computer system for converting a user interface panel between panel types comprises a first configuration table that can be used to display a first panel comprising a plurality of fields. The first panel belongs to a first type of panels in which a configuration table associated with a panel of the first type is tied to logic that specifies how the panel of the first type interacts with a backend of the computer system. A plurality of field attributes is associated with the plurality of fields. The computer system comprises a second configuration table that can be used to display a second panel comprising at least some of the plurality of fields. The second panel belongs to a second type of panels in which a panel of the second type is formed of configuration table entries and is independent of the backend. The computer system comprises a conversion module that converts at least some of the field attributes to be compatible with the second type of panels and stores them in the second configuration table for use in displaying the second panel.

The details of one or more embodiments are set forth in the accompanying drawings and the description below. Other features and advantages will be apparent from the description and drawings, and from the claims.

BRIEF DESCRIPTION OF THE DRAWINGS

Like reference numbers in the various drawings indicate like elements.

DETAILED DESCRIPTION

Figure 1:
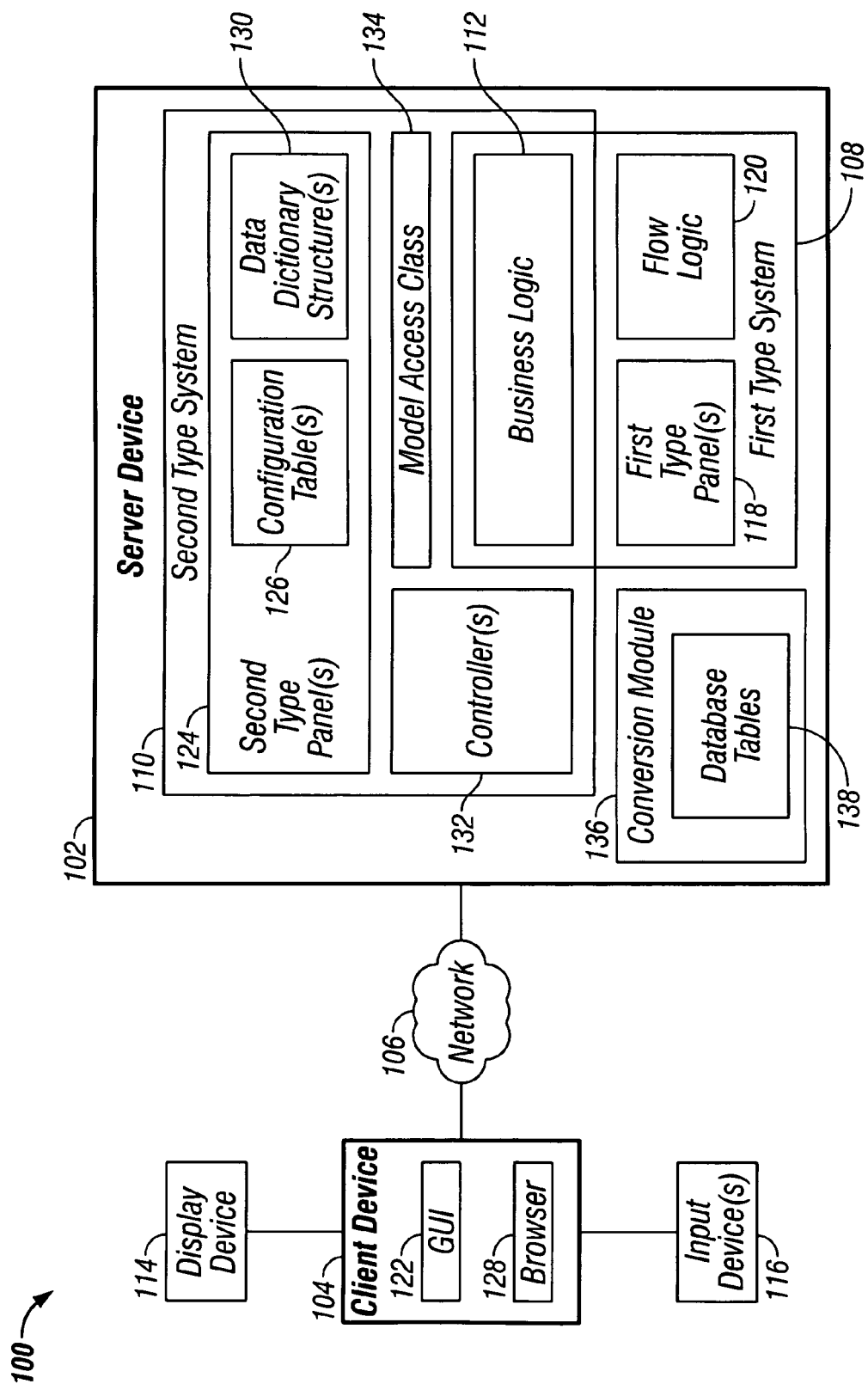
FIG. 1 is a block diagram of a computer system for converting a user interface panel between different panel types.

FIG. 1 is a block diagram of a computer system 100 that can be used for converting panels between panel types. The system 100 includes a server device 102 operably connected to a client device 104 through a network 106. The system 100 contains at least two different systems: a first type system 108 and a second type system 110. Each of the first and second type systems 108 and 110 operates in connection with business logic 112 on the server device 102. The business logic includes one or more application programs that are made accessible to a user through system 100.

The systems 108 and 110 are capable of operating independently and can for example interact with the business logic 112 to generate one or more panels that are displayed on a display device 114 connected to the client device 104. The user can interact with the system 100, through the displayed panel(s), using input device(s) 116 connected to the client device 104. As will be described below, the system 100 can be used for converting a panel from the first type system 108 to the second type system 110.

The first type system 108 includes one or more first type panels 118. The first type panel 118 comprises entries in configuration tables, such as relational database tables, and the first type system 108 reads these entries when the first panel is to be displayed. That is, underlying the visual form of the first type panel 118 that a user can see on the display is the configuration table entries stored on server device 102. The first type panel 118 typically comprises a number of fields that can be visible when the panel is displayed. The fields allow interaction between the user and the business logic 112, because there may be output fields for outputting information to the user and there may be input fields for the user to input information into the system 100. Fields are usually associated with one or more attributes that specify characteristics of the field. For example, fields may be associated with attributes that determine whether the field is hidden or visible, whether the user can edit contents of the field, the size of the field when it is displayed, or that a field should be displayed as a button, to name just a few examples.

The first type system 108 may comprise flow logic 120 that is tied to the configuration table entries of the first type panel 118 and specifies how the panel 118 interacts with the business logic 112, or a backend, of the computer system 100. Specifically, the flow logic 120 determines what happens in the system 100 after the user makes an input, such as selecting a function using input device 116. The flow logic 120 also determines what operations are performed in the system 100 before any given output is made, such as before the system displays the first type panel 118. As an example, the business logic 112 may provide data to the first type system 108 that is to be displayed using one or more of the first type panels 118. The interaction between the business logic 112 and the first type panel 118 occurs as specified by the flow logic 120 and the first type panel is generated in a form suitable for being transferred to the client device 102 for display.

In this implementation, the client device 102 includes a graphical user interface (GUI) 122 that is configured for the first type system 108. Particularly, the GUI 122 is configured for displaying the first type panels 118 on the display device 114. Accordingly, when the server device 104 transmits the first type panel 118 to the client device 102, it can be displayed using GUI 122. In implementations involving SAP dynpro panels, the GUI 122 may comprise the SAP graphical user interface SAPGUI that is a frontend of the R/3 system.

The second type system 110 includes one or more second type panel 124. The second type panel 124 comprises entries in configuration table(s) 126, such as a relational database table, and the second type system 110 reads these entries when the second type panel 124 is to be displayed. In this implementation, the second type panel(s) 124 is to be displayed by a browser 128 on the client device 104. Accordingly, the second type system 110 generates the second type panel(s) 124 in a format suitable for a browser program, such as in form of hypertext markup language (HTML) code transmitted using hypertext transfer protocol (HTTP) over the network 106.

The second type panel 124 comprises entries in at least one data dictionary structure (DDS) 130. More particularly, the DDS 130 contains fields that can be included in the second type panel 124 when it is displayed. In other words, underlying the visual form of the second type panel 124 that the user sees are entries in the configuration table(s) 126 and in the DDS 130. Accordingly, a particular second type panel 124 that is to correspond to the first type panel 118 may be created such that the DDS 130 contains those fields of the first type panel 118 that the second type panel should be able to display.

The second type system comprises controller(s) 132 and a model access class (MAC) 134 by which information can be transferred between the business logic 112 and the second type panels 124. The MAC 134 provides that the controller(s) 132 can access the business logic 112 to exchange information with an application therein through query, read and write operations, as applicable. The MAC 36 therefore implements all the methods used by the controller(s) 130 to obtain data from, and place data in, the application(s) of business logic 112. When more than one controller 132 is used, they may interact with the business logic 112 through the same MAC 134.

The second type panels 118 are independent of the business logic 112. That is, the business logic 112 cannot query the controller(s) 132 for user interface information, such as making a status inquiry regarding any of the second type panels 118. This independency, or separation from the backend, may facilitate that if the user interface is modified, it is not necessary to reprogram any application(s) in the business logic 112. Particularly, the second type panels 124 can be used without the GUI 122.

The server device 104 includes a conversion module 136 for converting the first type panel 118 to the second type panel 124. This conversion may be undertaken as an upgrade from the first type system 108 to the second type system 110. Converting the panel(s) may provide that users of the system 100 can interact with the application(s) in business logic 112 through the second type panels 124 rather than through the first type panels 118. Such a conversion may be a convenient way of upgrading the system 100 to use panels that are independent of the backend and to provide a better user interface solution.

Some attributes of the first type panel 118 may not be relevant for the second type panel 124. This may be because some attributes of the first type panel 118 have no parallel attribute(s) in the second type panel 124. Some fields of the first type panel 118 also may not occur in the second type panel 124. The relevant attributes may therefore be identified to the conversion module 136, such as by a user of the system 100 or by the conversion module accessing a data record where the relevant attributes are identified.

The conversion module 136 reads attributes from the first type panel 118 and may store them in memory before converting them as will be described below. The conversion module 136 may store the attributes in database tables 138. The conversion module 136 may first read the attributes of the first type panel 118 and then store the attributes in the database tables 138.

Whether or not the attributes were first stored in database tables 138, the conversion module 136 converts them to be compatible with the second type panel 124. That is, most of the relevant attributes of the first type panel cannot be directly applied to the fields of the second type panel 124 because of differences between the first and second type systems. The conversion module 136 stores the compatible attributes in the configuration table(s) 126 for use in displaying the second panel.

Figure 2:
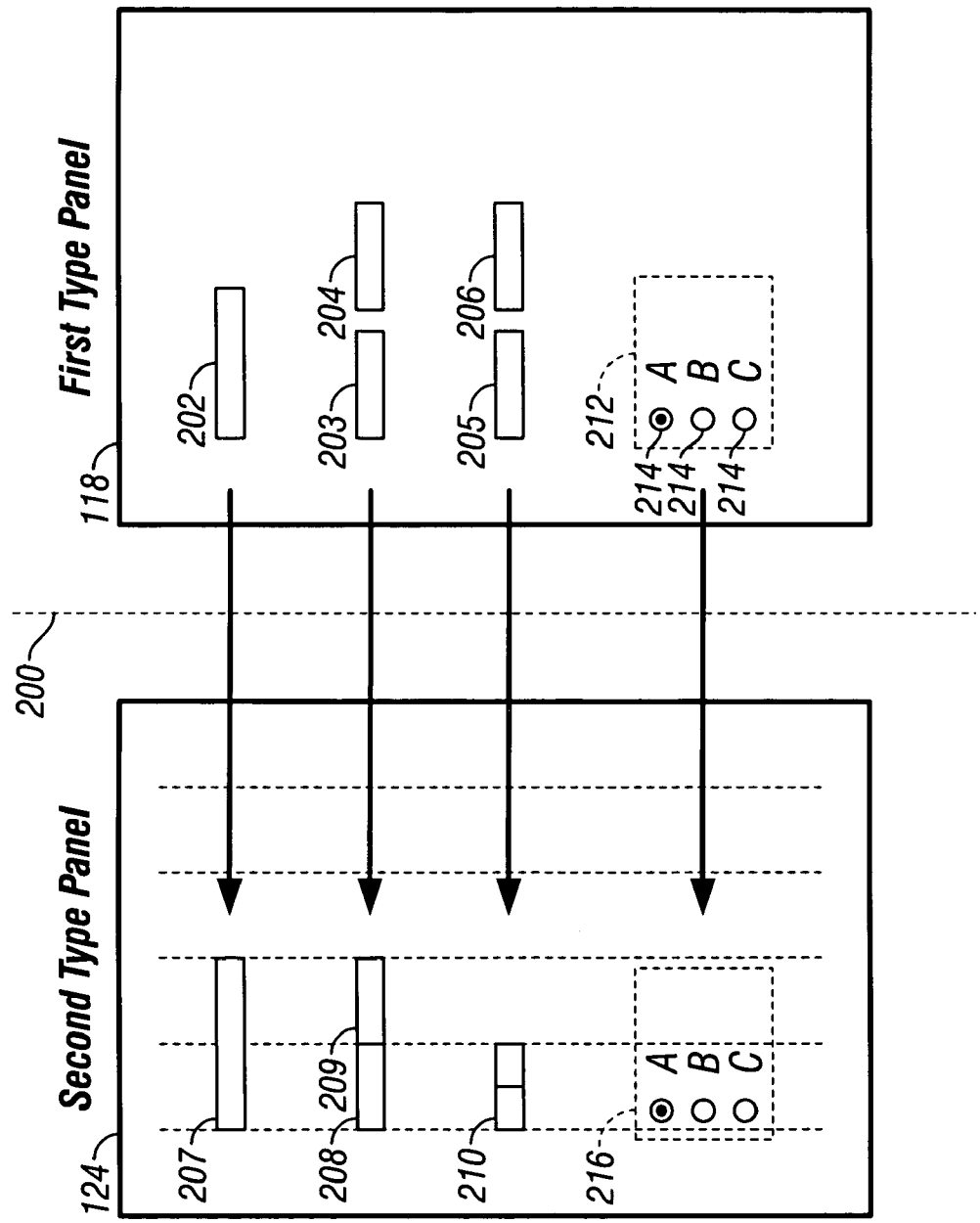
FIG. 2 is a conceptual view of panels belonging to different panel types.

Examples of how the conversion module 136 converts attributes of the first panel 118 to be compatible with the second panel 124 are described with reference to FIG. 2, which conceptually shows the visual forms of the first and second panels, respectively. A divider 200 conceptually illustrates that the first and second panels belong to different types. The first type panel includes fields 202, 203, 204, 205 and 206. Fields in the first type system 110 may have sizes specified in a number of characters. That is, a field in the first type panel 118 may be displayed with a length corresponding to a specified number of characters. Assume, for example, that the field 202 is associated with an attribute specifying it to be 25 characters long.

The second type system 110, on the other hand, may not specify the displayed size of fields the same way as does the first type system 108. For example, panels of the second type may be divided into a number of columns in which fields are to be arranged. Accordingly, the second type system 110 may specify lengths of fields as being one or more columns. The second type panel 124 in this example is divided in six equally wide columns.

The conversion module 136 therefore converts the attribute of the field 202 to be compatible with the second type panel 124. Specifically, the attribute may be converted from a number of characters to a number of columns. The conversion module 136 may refer to a conversion table that specifies, for example, that fields with a size of 0-20 characters are displayed in one column, fields of 21-40 characters are displayed in two columns and fields over 40 characters are displayed in three columns. In this example, the conversion module 136 converts the attribute for the field 202 such that it is displayed as field 207 extending across two columns in the second type panel 124.

The conversion module 136 also may recognize certain patterns of fields in the first type panel 118 and convert their attributes accordingly. This may, for example, preserve logical, semantic, contextual or other relationships between fields in the conversion. As an example, the conversion module 136 may detect that two fields 203 and 204 are template fields, that is, they have a specific format that the user can see when the field is displayed. One example of template fields are date fields, which may appear like this on the screen:

_/_/_

Another example of a template field is a time field, which may be displayed like this:

_:_:_

In these examples, the underscore characters represent numbers that make up the date or time, respectively. When template fields are displayed next to each other on a common row, and the second field is not an input field, this may signal a relationship between the template fields. For example, a field where the user can enter a specific date is sometimes followed by a field stating the proper format for entering dates. The occurrence of a non-input template field following next to a template field may therefore indicate that the second of the two fields is a text field associated with data that is to be entered in the first field. Accordingly, the second field may be related to the first field. This possible relation should be taken into account in the conversion.

In this example, the conversion module 136 determines that the fields 203 and 204 are template fields to be displayed next to each other on a common row of the first type panel 118, and that field 204, the second of the two fields, is not an input field. The conversion module then converts the attributes for the fields 203 and 204 such that the fields 203 and 204 are displayed on the same row of the second type panel 124, here shown as fields 208 and 209 which are sometimes collectively referred to as a "logical field group". In other words, the attributes of fields 208 and 209 specify that they are to be displayed on a common row, thereby avoiding that they are placed on different rows, which may otherwise happen. Thus, if there was a relationship connecting the fields 203 and 204, it is preserved in the conversion.

Another pattern that the conversion module 136 can recognize relates to adjacent input fields. For example, the conversion module 136 may determine that the fields 205 and 206, which are displayed next to each other on the first type panel 118, are both input fields. This pattern suggests that there is a relation between the input fields, such that the data entered in one of the fields is connected to the data entered in the other one. Were the two input fields unrelated, it could be expected that some explanatory text or template field would exist between them.

One example of a relation that may produce a pattern like this is an input field for a currency value and an adjacent input field for the currency name. The user is expected to enter a currency value (such as 100) in the first field, and a currency name (such as the characters "USD" or "$") in the adjacent field. If this relation between the fields exists, it should be taken into account in the conversion.

Here, the conversion module 136 determines that the fields 205 and 206 are displayed next to each other in the same row of the first type panel 118 and that they are both input fields. The conversion module converts the attributes of the fields 205 and 206 so that they are displayed in the same row and in the same column of the second type panel 124, here shown as a so called "field melting group" 210. Thus, while fields in the second type panel 124 generally are displayed with a width of one column or more, the field melting group 210 allows two fields to be displayed in a common row and in a common column. If the fields 205 and 206 were related, the relation is preserved in the conversion.

The first type panel 118 also comprises a control 212 including three binary fields 214 that a user can select individually. That is, the three binary fields 214 may be mutually exclusive (only one of them can be selected at a time) or not mutually exclusive (two or more of them can be selected at a time). Each of the binary fields 214 may have a descriptive text next to it. One example of this type of control is a so called "radio button group".

In the first type system 108, controls such as control 212 may be associated with a Boolean variable for each of the binary fields 214. Each Boolean variable corresponds to the current setting of its binary field and may be part of the configuration table for the first type panel. In this example, the first type panel 118 has three Boolean variables corresponding to the three binary fields 214.

The second type system 110, in contrast, may use a single field to represent a control such as control 212, regardless of the number of binary fields it includes. The DDS 130 may contain a data element for the single field that contains a domain with fixed values. When the panel of the second type having the field is displayed, the values appear as the binary field options on the screen. Accordingly, the conversion module 136 converts the attribute(s) associated with the control 212 to be compatible with the second type panel 124, such that a field 216 associated with the corresponding data element appears upon display.

Figure 3:
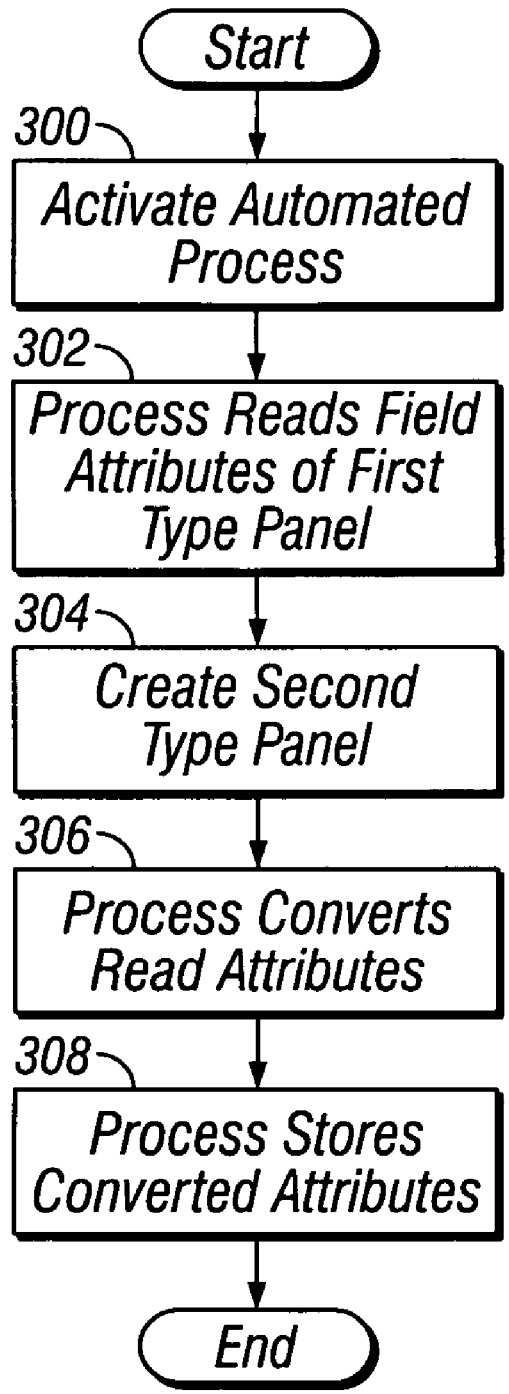
FIG. 3 is a flow chart of a method of converting a user interface panel between different panel types.

FIG. 3 is an embodiment of a method of converting user interface panels between different panel types. At step 300, an automated process is activated that can convert field attributes associated with fields in a first type panel. The automated process reads the field attributes in step 302. The automated process may read those attributes that are relevant to converting the first type panel to a second type panel.

The second type panel is created in step 304. The second type panel may include some or all of the fields of the first type panel. In step 306, the automated process converts the read attributes to be compatible with the second type panel. The process may store the converted attributes in step 308. As noted above, the conversion module 136 may store the compatible attributes in configuration table(s) 126 for use in displaying the second type panel.

Figure 4:
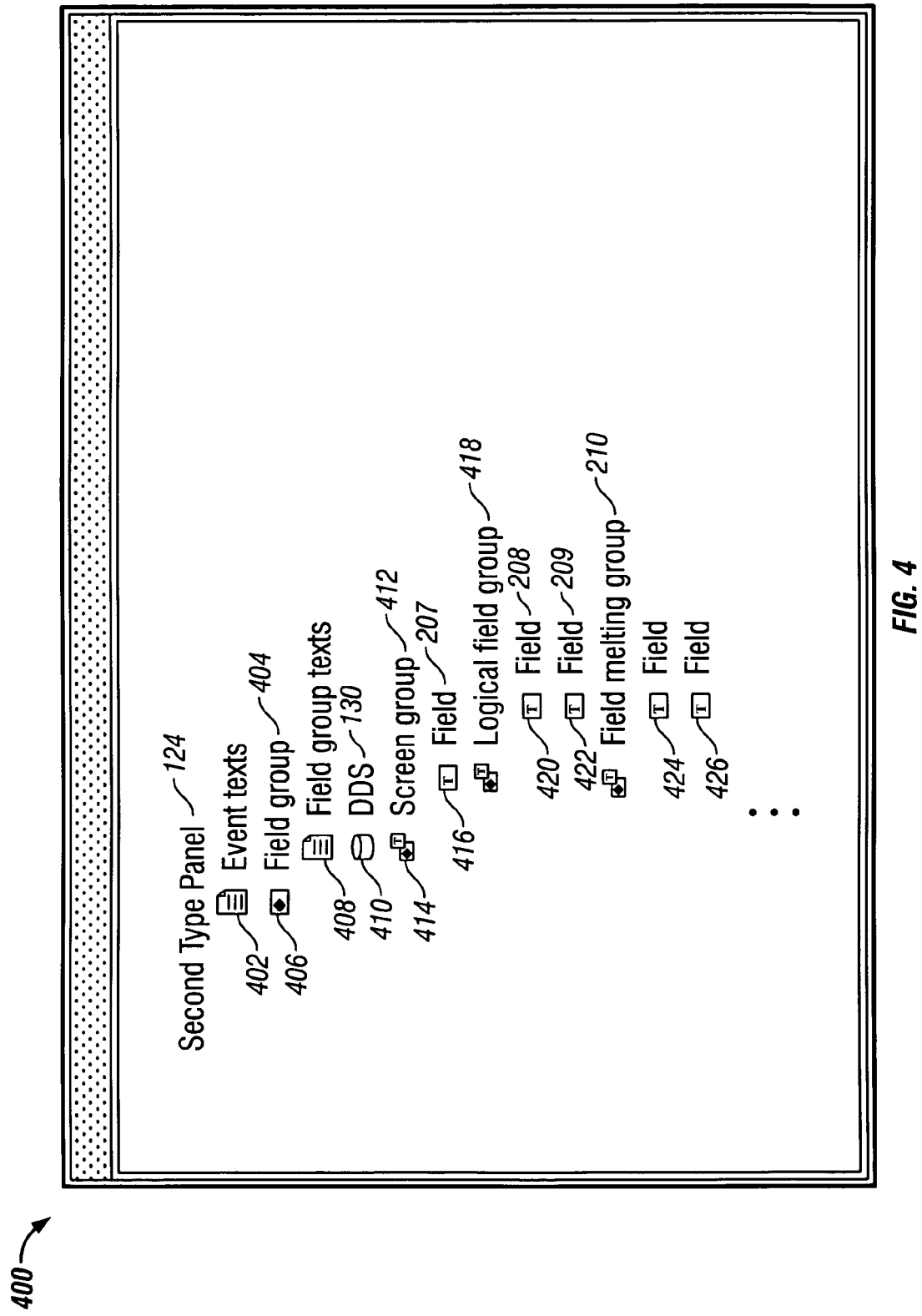
FIG. 4 is a screen for editing panels that can be displayed by the computer system shown in FIG. 1.

The system 100 may provide that a user can edit the second type panel 124. That is, the conversion module 136 converts attributes from the first type panel 118 and stores them for use in displaying the second panel 124, and the user may wish to edit aspects of the second panel 124. This may involve editing the attributes converted from the first type panel 118. The system 100 can display the second type panel 124 such that the user can decide what, if anything, about the panel should be modified. After modification, the user can see what the modified panel looks like. An example of such editing is described with reference to FIG. 4.

The conversion module 136 can generate a panel 400 to appear on the display device 114. The panel 400 provides that a user can edit one or more aspects of the second type panel 124. It will be described below that the panel 400 may provide a drag-and-drop environment for editing the second panel.

At the top of panel 400 is the name of the second type panel 124 to inform the user which panel is currently being edited. Below the name of the panel is an icon 402 by which the user can review and edit event texts for the second type panel 124. Events link the fields of a panel with its underlying configuration table. Event texts are displayed when the various events are triggered. Below the event texts icon is listed a field group 404 in which fields of the second type panel 124 are collected. The second type panel 124 may comprise one or more field groups. The field group 404 encompasses a number of fields and specifies how they are to be displayed, for example by defining the order of the fields, their grouping and framing around fields. The user can review and edit properties of the field group 404 by clicking on an icon 406. Doing so may cause a different view to appear in which properties are displayed. The field group 404 comprises field group texts which the user can review and edit using icon 408. Below the field group texts icon the panel 400 lists the DDS 130 which the user can review and edit using icon 410.

Next is a screen group 412 which holds fields of the second type panel 124. A field group may contain one or more screen groups. The user can review and edit properties of the screen group 412 by clicking on an icon 414. The screen group 412 in this example comprises the field 207 (see FIG. 2), a logical field group 418 that includes the fields 208 and 209, and the field melting group 210. The user can review and edit properties of these groups by clicking on their respective icons. The user may click on an icon of any of the fields to review and edit its attributes. The fields 208 and 209 have icons 420 and 422, respectively. Clicking on any of the icons 420 and 422 may cause a different view to appear that lists the attributes of that field and in which the user can make the desired changes. The fields of the field melting group 210 have corresponding icons 424 and 426 by which their attributes can be reviewed and edited.

Fields, logical field groups and field melting groups may be rearranged in the panel 400. Doing so will change the order of fields in the displayed second type panel 124. For example, the panel 400 may comprise a drag-and-drop environment by which the user can move items using the mouse or other input device. This may be implemented by marking any fields, logical field groups and field melting groups as drag-and-drop sources in the panel 400. In this example, the sources can be dropped onto any screen group, logical field group and field melting group, which are therefore defined as targets for drag-and-drop actions in the panel 400. If the user clicks on and drags a field, logical field group or field melting group, the panel 400 recognizes it as a drag-and-drop source and prepares to receive information about a target—that is, the position where the user releases the dragged item. When the item is released, its target location is recognized and the second type panel 124 is updated with information about the change.

The systems and techniques described here may offer any of the following advantages. The work in creating new user interface panels may be reduced by converting existing ones. The conversion of a user interface panel may be more efficient. Conversion of more than one user interface panel may be more consistent. Relations between fields in a panel may be preserved when it is converted. More convenient editing of the converted panel may be provided.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of converting a computer user interface panel between different panel types, the method comprising:

identifying a first panel associated with a first computer system configured for displaying panels of a first type and not web-based panels;

activating an automated process that reads field attributes in a first configuration table that can be used to display the first panel in the first computer system, the first panel comprising a plurality of fields and belonging to the first type of panels that is not web-based and in which a configuration table associated with a panel of the first type is tied to logic that specifies how the panel of the first type interacts with a backend of the first computer system;

creating entries in a second configuration table that can be used to display a second panel in a second computer system configured for displaying panels of a second type that is web-based, the second panel comprising at least some of the plurality of fields and belonging to the second type of panels in which a panel of the second type is formed of configuration table entries and is independent of a backend of the second computer system; and displaying the second panel to a user of the second computer system;

wherein the automated process:

(i) detects a pattern among the field attributes in the first configuration table, the detected pattern comprising a first field attribute corresponding to an input field that is located on a common row and next to a non-input field corresponding to a second field attribute, wherein the detected pattern corresponds to a format for providing input to the input field, (ii) converts the field attributes to be compatible with the second type of panels in a manner such that the detected pattern between the first field attribute and the second field attribute is preserved when the second panel is displayed to the user by the second computer system, and (iii) stores the converted field attributes in the second configuration table for use by the second computer system in displaying the second panel.

2. The method of claim 1, further comprising associating the field attributes with fields of the second panel.

3. The method of claim 1, wherein the field attributes that are read in the first configuration table are those field attributes of the first panel that are relevant for converting the first panel to the second panel.

4. The method of claim 1, wherein the plurality of fields comprises first and second template fields to be displayed next to each other on a common row in the first panel, wherein converting attributes associated with the first and second template fields comprises determining whether the second template field is an input field.

5. The method of claim 4, wherein the second template field is not an input field, further comprising converting the attributes associated with the first and second template fields so that the first and second template fields will be displayed on a common row of the second panel.

6. The method of claim 1, wherein the detected pattern comprises a date field with blank characters representing numbers that make up a date and backslash characters separating the numbers.

7. The method of claim 1, wherein the detected pattern comprises a time field with blank characters representing numbers that make up a time and colon characters separating the numbers.

8. The method of claim 1, wherein the panels of the second type comprise columns in which the fields are arranged and wherein each of the plurality of fields has a length specified as a number of characters, wherein converting the field attributes comprises assigning a specific width of at least one column to each of the fields based on its specified length.

9. The method of claim 1, wherein the first panel comprises a plurality of binary controls that can be individually selected by a user, and wherein panels of the first type having such binary controls comprise a Boolean variable for each of the binary controls, wherein attributes associated with the binary controls are converted so that one of the fields of the second panel represents the binary controls.

10. The method of claim 1, further comprising receiving and executing a user input for editing the second panel.

11. The method of claim 10, wherein the input is received and executed in a drag-and-drop environment.

12. The method of claim 10, wherein the input changes a location of one of the fields of the second panel.

13. The method of claim 10, wherein the input changes an attribute of one of the fields of the second panel.

14. A computer system for converting a user interface panel between different panel types, the system comprising:

a first configuration table for use by a first computer system to display a first panel comprising a plurality of fields and belonging to a first type of panels that is not web-based and in which a configuration table associated with a panel of the first type is tied to logic that specifies how the panel of the first type interacts with a backend of the first computer system, a plurality of field attributes being associated with the plurality of fields, the first computer system being configured for displaying panels of the first type and not web-based panels;

a second configuration table for use by a second computer system to display a second panel comprising at least some of the plurality of fields and belonging to a second type of panels that is web-based and in which a panel of the second type is formed of configuration table entries and is independent of a backend of the second computer system; and a conversion module that converts at least some of the field attributes to be compatible with the second type of panels and stores them in the second configuration table for use by the second computer system in displaying the second panel, wherein the conversion module:

(i) detects a pattern among the field attributes in the first configuration table, the detected pattern comprising a first field attribute corresponding to an input field that is located on a common row and next to a non-input field corresponding to a second field attribute, wherein the detected pattern corresponds to a format for providing input to the input field, (ii) converts the field attributes to be compatible with the second type of panels in a manner such that the detected pattern between the first field attribute and the second field attribute is preserved when the second panel is displayed to the user by the second computer system, and (iii) stores the converted field attributes in the second configuration table for use by the second computer system in displaying the second panel.

15. The computer system of claim 14, wherein the conversion module is capable of receiving and executing a command for editing the second panel.

16. The computer system of claim 14, wherein the conversion module provides a drag-and-drop environment for receiving and executing the command.

17. The computer system of claim 14, further comprising a drag-and-drop environment displayable on a screen by which a user can edit the second panel.

18. A computer program product tangibly embodied in a computer-readable storage device, the computer program product containing executable instructions that when executed cause a processor to perform operations comprising:
    identifying a first panel associated with a first computer system configured for displaying panels of a first type and not web-based panels;
    activating an automated process that reads field attributes in a first configuration table that can be used to display the first panel in the first computer system, the first panel comprising a plurality of fields and belonging to the first type of panels that is not web-based and in which a configuration table associated with a panel of the first type is tied to logic that specifies how the panel of the first type interacts with a backend of the first computer system; and
    creating entries in a second configuration table that can be used to display a second panel in a second computer system configured for displaying panels of a second type that is web-based, the second panel comprising at least some of the plurality of fields and belonging to the second type of panels in which a panel of the second type is formed of configuration table entries and is independent of a backend of the second computer system; and
    displaying the second panel to a user of the second computer system;
    wherein the automated process:
    (i) detects a pattern among the field attributes in the first configuration table, the detected pattern comprising a first field attribute corresponding to an input field that is located on a common row and next to a non-input field corresponding to a second field attribute, wherein the detected pattern corresponds to a format for providing input to the input field,
    (ii) converts the field attributes to be compatible with the second type of panels in a manner such that the detected pattern between the first field attribute and the second field attribute is preserved when the second panel is displayed to the user by the second computer system, and
    (iii) stores the converted field attributes in the second configuration table for use by the second computer system in displaying the second panel.

19. The computer program product of claim 18, further comprising instructions that when executed cause the processor to perform operations comprising:
    receiving and executing a command for editing the second panel.

20. The computer program product of claim 19, further comprising instructions that when executed cause the processor to perform operations comprising:
    presenting a drag-and-drop environment where a user can edit the second panel.

* * * * *